(12) United States Patent
Pequito et al.

(10) Patent No.: US 12,544,013 B2
(45) Date of Patent: Feb. 10, 2026

(54) FRACTIONAL-ORDER MODEL PREDICTIVE CONTROL FOR NEUROPHYSIOLOGICAL CYBER-PHYSICAL SYSTEMS

(71) Applicant: Rensselaer Polytechnic Institute, Troy, NY (US)

(72) Inventors: Sergio Pequito, Delft (NL); Orlando Romero, Philadelphia, PA (US); Sarthak Chatterjee, Endicott, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 1272 days.

(21) Appl. No.: 17/228,775

(22) Filed: Apr. 13, 2021

(65) Prior Publication Data
US 2021/0315527 A1    Oct. 14, 2021

Related U.S. Application Data

(60) Provisional application No. 63/173,559, filed on Apr. 12, 2021, provisional application No. 63/009,160, filed on Apr. 13, 2020.

(51) Int. Cl.
*A61B 5/00* (2006.01)

(52) U.S. Cl.
CPC .......... *A61B 5/7275* (2013.01); *A61B 5/7203* (2013.01); *A61B 5/7221* (2013.01); *A61B 5/7282* (2013.01)

(58) Field of Classification Search
CPC ............................ A61B 5/7275; A61B 5/7203
USPC ......................................................... 607/62
See application file for complete search history.

(56) References Cited

U.S. PATENT DOCUMENTS

| | | | |
|---|---|---|---|
| 7,333,851 B2 | 2/2008 | Echauz et al. | |
| 7,623,928 B2 | 11/2009 | DiLorenzo | |
| 7,630,757 B2 | 12/2009 | Dorfmeister et al. | |
| 7,840,507 B2 | 11/2010 | Snyder | |
| 8,024,032 B1 | 9/2011 | Osorio et al. | |
| 8,065,011 B2 | 11/2011 | Echauz et al. | |

(Continued)

FOREIGN PATENT DOCUMENTS

| | | | |
|---|---|---|---|
| EP | 3437692 A1 | 2/2019 | |
| WO | WO-2012167140 A1 * | 12/2012 | ......... A61B 5/04001 |
| WO | 2019026092 A1 | 2/2019 | |

*Primary Examiner* — Nicole F Johnson
(74) *Attorney, Agent, or Firm* — Barclay Damon LLP; Anthony P. Gangemi (57) ABSTRACT

One embodiment provides a system controller circuitry for mitigating a neurophysiological disorder. The system controller circuitry includes an optimization module, a feedback control module, and a model update module. The optimization module is configured to predict a sequence of control inputs based, at least in part, on a fractional order model of a neurophysiological system. A duration of the predicted sequence of control inputs corresponds to a prediction horizon. The feedback control module is configured to provide at least a portion of the sequence of control inputs to the neurophysiological system based, at least in part, on a current state of the neurophysiological system. A duration of the at least a portion corresponds to a control horizon. The model update module is configured to update one or more of a model parameter and/or an objective function parameter at an update interval, based, at least in part, on a recent state of the neurophysiological system.

20 Claims, 2 Drawing Sheets

(56) References Cited

U.S. PATENT DOCUMENTS

| | | |
|---|---|---|
| 8,165,683 B2 | 4/2012 | Carlson et al. |
| 8,374,696 B2 | 2/2013 | Sanchez et al. |
| 8,594,779 B2 | 11/2013 | Denison et al. |
| 8,600,513 B2 | 12/2013 | Aur et al. |
| 8,762,065 B2 | 6/2014 | DiLorenzo |
| 8,849,390 B2 | 9/2014 | Echauz et al. |
| 8,868,172 B2 | 10/2014 | Leyde et al. |
| 8,886,325 B2 | 11/2014 | Boling et al. |
| 8,923,958 B2 | 12/2014 | Gupta et al. |
| 9,724,513 B2 | 8/2017 | Lane et al. |
| 9,955,905 B2 | 5/2018 | Intrator |
| 10,123,750 B2 | 11/2018 | Witcher et al. |
| 10,124,169 B2 | 11/2018 | Sabesan et al. |
| 10,172,567 B2 | 1/2019 | Moxon et al. |
| 10,220,207 B2 | 3/2019 | Simon et al. |
| 10,245,431 B2 | 4/2019 | Baldassano et al. |
| 2018/0211010 A1 | 7/2018 | Malhotra et al. |
| 2018/0360339 A1* | 12/2018 | Sargolzaei ............ A61B 5/4094 |
| 2019/0030337 A1 | 1/2019 | Crowder et al. |

\* cited by examiner

FRACTIONAL-ORDER MODEL PREDICTIVE CONTROL FOR NEUROPHYSIOLOGICAL CYBER-PHYSICAL SYSTEMS

CROSS REFERENCE TO RELATED APPLICATION(S)

This application claims the benefit of U.S. Provisional Application No. 63/009,160, filed Apr. 13, 2020, and U.S. Provisional Application No. 63/173,559, filed Apr. 12, 2021, which are incorporated by reference as if disclosed herein in their entireties.

GOVERNMENT LICENSE RIGHTS

This invention was made with government support under grant number CMMI 1936578, awarded by the National Science Foundation (NSF). The government has certain rights in the invention.

FIELD

The present disclosure relates to fractional-order model predictive control and, in particular, to fractional-order model predictive control for neurophysiological cyber-physical systems.

BACKGROUND

Electrical neurostimulation is a therapeutic methodology for neurological disorders such as epilepsy. Electrical neurostimulation devices generally include sensing, actuating, and processing capabilities. Sensors generally are configured to measure electrical activity in the brain. A processor may be configured to analyze the measured electrical activity and, if a predetermined criterion is met, may trigger an actuator to release a predefined electrical charge into the brain. Electrical neurostimulation devices may have relatively limited sensing, actuating, and processing capabilities. For example, the sensing mechanisms may be configured for detecting electrical activity (e.g., to detect seizures), and may then trigger actuation of a predefined stimulation dose. The predefined stimulation dose may be determined in advance during a period of manual (and empirical) calibration. The potential information contained in the measurements acquired by the sensing mechanisms may generally not be utilized.

SUMMARY

In some embodiments, there is provided a system controller circuitry for mitigating a neurophysiological disorder. The system controller circuitry includes an optimization module, a feedback control module, and a model update module. The optimization module is configured to predict a sequence of control inputs based, at least in part, on a fractional order model of a neurophysiological system. A duration of the predicted sequence of control inputs corresponds to a prediction horizon. The feedback control module is configured to provide at least a portion of the sequence of control inputs to the neurophysiological system based, at least in part, on a current state of the neurophysiological system. The duration of the at least a portion corresponds to a control horizon. The model update module is configured to update one or more of a model parameter and/or an objective function parameter at an update interval, based, at least in part, on a recent state of the neurophysiological system.

In some embodiments of the system controller circuitry, the control horizon corresponds to a first portion of the prediction horizon.

In some embodiments of the system controller circuitry, a value of each control input of the predicted sequence of control inputs is subject to a constraint.

In some embodiments of the system controller circuitry, the feedback control module is configured to provide the at least a portion of the sequence of control inputs to the neurophysiological system in response to detecting an abnormality in the neurophysiological system.

In some embodiments of the system controller circuitry, the model parameters are selected from the group including a fractional order coefficient ($\alpha$), a state coupling matrix dimension, a state coupling matrix (A), an input matrix (B), a weight matrix ($B^w$), and a noise term w characteristic.

In some embodiments of the system controller circuitry, the objective function parameters are selected from the group including a state quadratic matrix (Q), an input coefficient vector (c), an input quadratic matrix (R), and a prediction horizon (P) value.

In some embodiments of the system controller circuitry, the fractional order model includes a noise term.

In some embodiments, there is provided a method for mitigating a neurophysiological disorder. The method includes predicting, by an optimization module, a sequence of control inputs based, at least in part, on a fractional order model of a neurophysiological system. A duration of the predicted sequence of control inputs correspond to a prediction horizon. The method further includes providing, by a feedback control module, at least a portion of the sequence of control inputs to the neurophysiological system based, at least in part, on a current state of the neurophysiological system. A duration of the at least a portion corresponds to a control horizon. The method further includes updating, by a model update module, one or more of a model parameter and/or an objective function parameter at an update interval, based, at least in part, on a recent state of the neurophysiological system.

In some embodiment of the method, the control horizon corresponds to a first portion of the prediction horizon.

In some embodiment of the method, a value of each control input of the predicted sequence of control inputs is subject to a constraint.

In some embodiments, the method further includes providing, by the feedback control module, the at least a portion of the sequence of control inputs to the neurophysiological system in response to detecting an abnormality in the neurophysiological system.

In some embodiment of the method, the model parameters are selected from the group including a fractional order coefficient ($\alpha$), a state coupling matrix dimension, a state coupling matrix (A), an input matrix (B), a weight matrix ($B^w$), and a noise term w characteristic.

In some embodiment of the method, the objective function parameters are selected from the group including a state quadratic matrix (Q), an input coefficient vector (c), an input quadratic matrix (R), and a prediction horizon (P) value.

In some embodiment of the method, the fractional order model includes a noise term.

In some embodiments, there is provided a computer readable storage device having stored thereon instructions that when executed by one or more processors result in the following operations including: predicting a sequence of control inputs based, at least in part, on a fractional order model of a neurophysiological system. A duration of the predicted sequence of control inputs corresponds to a prediction horizon. The operations further include providing at least a portion of the sequence of control inputs to the neurophysiological system based, at least in part, on a current state of the neurophysiological system. A duration of the at least a portion corresponds to a control horizon. The operations further include updating one or more of a model parameter and/or an objective function parameter at an update interval, based, at least in part, on a recent state of the neurophysiological system.

In some embodiments of the computer readable storage device, the control horizon corresponds to a first portion of the prediction horizon.

In some embodiments of the computer readable storage device, a value of each control input of the predicted sequence of control inputs is subject to a constraint.

In some embodiments of the computer readable storage device, the instructions that when executed by one or more processors result in the following operations including providing the at least a portion of the sequence of control inputs to the neurophysiological system in response to detecting an abnormality in the neurophysiological system.

In some embodiments of the computer readable storage device, the model parameters are selected from the group including a fractional order coefficient ($\alpha$), a state coupling matrix dimension, a state coupling matrix (A), an input matrix (B), a weight matrix ($B^w$), and a noise term w characteristic, and the objective function parameters are selected from the group including a state quadratic matrix (Q), an input coefficient vector (c), an input quadratic matrix (R), and a prediction horizon (P) value.

In some embodiments of the computer readable storage device, the fractional order model includes a noise term.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Although the following Detailed Description will proceed with reference being made to illustrative embodiments, many alternatives, modifications, and variations thereof will be apparent to those skilled in the art.

DETAILED DESCRIPTION

Generally, this disclosure relates to fractional-order model predictive control and, in particular, to fractional-order model predictive control for neurophysiological cyber-physical systems. In an embodiment, a system controller circuitry is configured to mitigate a neurophysiological disorder. The system controller circuitry is configured to receive sensor data corresponding to electrical activity of a neurophysiological system, and to provide an actuation control signal configured to provide a therapeutic electrical signal to the neurophysiological system, based, at least in part on the electrical activity of the neurophysiological system. As used herein, neurophysiological system includes at least a portion of a central nervous system (e.g., at least a portion of a brain, and/or at least a portion of a spinal cord) and/or at least a portion of a peripheral nervous system (i.e., at least a portion of a nervous system outside the brain and spinal cord, e.g., one or more peripheral nerve(s)). The sensor data may be received from, and the actuation control signal may be provided to, for example, a stimulation subsystem that is coupled to a treatment target of the neurophysiological system. In one nonlimiting example, the treatment target may correspond to at least a portion of a human brain. However, this disclosure is not limited in this regard.

In an embodiment, the system controller circuitry may include a fractional order model predictive controller configured to generate the actuation control signal based, at least in part, on the sensed electrical activity of the neurophysiological system. The system controller circuitry may be configured to determine a set of model parameters, constraints and objective function parameters that correspond to the fractional order model predictive controller. The system controller circuitry may be further configured to update the model parameters, constraints and objective function parameters based, at least in part, on current state data corresponding to current and/or recently sensed electrical activity of the neurophysiological system.

Electrical neurostimulation refers to the activation or modulation of part of the nervous system for the mitigation of neurological disorders. Dynamical spatiotemporal models may be utilized to model neurophysiological data. As used herein, "spatial" corresponds to a contribution to a signal from another source, e.g., elsewhere in the neurophysiological system, relative to a location of the sensor. Such models may be utilized to predict how an external signal or stimulus may affect or may be configured to affect process dynamics. In other words, a model may be utilized to facilitate design of a control strategy configured to steer system dynamics to selected properties to mitigate a neurophysiological disorder, e.g., to mitigate an epileptic seizure.

Thus, the actuation control signal may be determined based, at least in part, on characteristics of the sensed electrical activity of the neurophysiological system. The model that represents the electrical activity of the neurophysiological system may be updated to correspond to a current status of the neurophysiological system. In one nonlimiting example, the actuation control signal may be configured to mitigate or minimize brain electrical activity associated with an epileptic seizure. However, this disclosure is not limited in this regard.

Model predictive control (MPC) generally includes a model-based approach with a capability of predicting an evolution of a system and system states. The prediction capability may then correspond to a feedback control strategy configured to optimize an objective that includes risk of abnormal behavior, and a receding finite horizon reevaluation of the corresponding control strategy. In one nonlimiting example, in the context of neurophysiological processes, the model predictive control may be implemented with a fractional order model configured to provide prediction and control in a closed loop fashion.

In one nonlimiting example, a control objective for mitigating an epileptic seizure corresponds to steering measured brain signals during an ictal period toward a normal range of activity through electrical stimulation. Thus, optimization may be configured to encode and penalize a difference with respect to the goal, as well as account for a total use of the actuation (i.e. electrical stimulation).

MPC is a control strategy that allows the control of a process while satisfying a set of constraints. MPC uses explicit process models (which may be linear or non-linear) to predict how a plant will respond to arbitrary inputs. For each instant of time, an MPC algorithm may be configured to optimize plant behavior at a future time by determining a series of control inputs over a time horizon by solving an optimization problem—often with constraints. The time horizon corresponds to a prediction horizon. A subset of the determined control inputs corresponding to a first subsection of the prediction horizon may then be sent to the plant. The first subsection of the prediction horizon corresponds to a control horizon. The process may then be repeated at subsequent control intervals. This receding horizon strategy may then correspond to closed-loop feedback.

In an embodiment, a state-space model may be implemented and a predictive model may be obtained from a linear FOS (fractional order system). Based on evolution of a state signal predicted by the model, and by regarding an impact of an arbitrary control input signal in the state's evolution, a stimulation signal may be developed in real-time by selecting parameters that lead to stimulation signals within a safe range toward optimizing some measure of performance that encapsulates the goal of steering abnormal activity to normal ranges. In general, the predictive model may not exactly match actual dynamics of the system. Therefore, the stimulation strategy may include periodically re-evaluating a current estimated state and corresponding predictions, and updating an appropriate optimal stimulation strategy.

In a fractional-order MPC framework, a model predictive controller for a (possibly time-varying) discrete-time fractional-order dynamical system model may be written as:

$$\Delta^\alpha x_{k+1} = A_k x_k + B_k u_k + B_k^w w_k \quad (1a)$$

$$x_{k+1} = \sum_{j=0}^{k} A_{k,j} x_{k-j} + B u_k + w_k \quad (1b)$$

where:

k corresponds to a time step, k=0, 1, . . . , $\Delta^\alpha$ corresponds to a generalized Grünwald-Letnikov fractional-order difference operator generalized for multivariate signals ($x_{k+1}=[x_{k+1}^1, \ldots, x_{k+1}^n]^T \in \mathbb{R}^n$) and individual fractional order coefficients ($\alpha=[\alpha_1, \ldots, \alpha_n]^T$ with $\alpha_1, \ldots, \alpha_n > 0$, and $\Delta^\alpha = \text{diag}(\Delta^{\alpha_1}, \ldots, \Delta^{\alpha_n})$), $x_{k+1}$ is a state vector, $A_{k,j}$ is a state coupling matrix ($A_{k,0}=A_k-\text{diag}(\alpha_1, \ldots, \alpha_n)$ for j=0, and $A_{k,j}=-D(\alpha, j+1)$ for $j \neq 0$ and $D(\alpha, j+1)$ corresponding to a diagonal matrix with matrix weights that deca as j increases), $u_k$ ($u_k \in \mathbb{R}^{n_u}$) is an input vector corresponding to an actuation signal, B ($B \in \mathbb{R}^{n \times n_u}$) is an input matrix configured to scale the input signal, $w_k$ denotes a sequence of independent and identically distributed random vectors, following an $\mathcal{N}(0, \Sigma)$ distribution (with the covariance matrix $\Sigma \in \mathbb{R}^{n \times n}$), i.e., is a noise term, and $B_k^w$ denotes a matrix of weights that scales the noise term $w_k$. In one nonlimiting example, $w_k$ may correspond to additive white Gaussian noise (AWGN).

As used herein, a total number of state variables, n, may be greater than or equal to a number of sensing channels, N. A difference between the total number of state variables and number of channels (i.e., n–N) corresponds to hidden or latent signals that may influence, directly or indirectly, an evolution of measured signals and thus, the underlying system itself. State variables may be temporal or spatio-temporal. The spatial component may be included as either additional independent variables of the state variables or by a mapping of some subset of the state variables to spatial locations, in which each state variable corresponds to a respective physical location of a corresponding electrode.

The state coupling matrix A is related to spatial dependence and $\alpha$ is related to temporal long-term dependence. It may be appreciated that Equations (Eqs.) 1a and 1b correspond to a time varying discrete time fractional order dynamical system, as indicated by the subscript, k, on the state coupling matrix, A. It may be further appreciated that, in a time invariant system, the state coupling matrix, A, may not be dependent on the time step, k.

An objective of a fractional-order MPC framework is to design the feedback controller such that it minimizes a quadratic cost functional of the input and state vectors over a finite time horizon P (the prediction horizon). In other words, the objective is to determine a sequence of control inputs $u_k, \ldots, u_{k+P-1}$ configured to minimize a quadratic cost function of the form:

$$\min_{u_k, \ldots, u_{k+P-1}} \mathbb{E}\left\{\sum_{j=1}^{P} \|x_{k+j}\|_{Q_{k+j}}^2 + \sum_{j=1}^{P} c_{k+j}^T x_{k+j} + \sum_{j=0}^{P-1} \|u_{k+j}\|_{R_{k+j}}^2\right\} \quad (2a)$$

subject to:

$x_k$ = observed or estimated current state, (2b)

$\Delta^\alpha x_{k+j+1} = A_{k+j} x_{k+j} + B_{k+j} u_{k+j} + B_{k+j}^w w_{k+j}, j = 0, 1, \ldots, P-1,$ (2c)

other linear constraints on $x_{k+1}, \ldots, x_{k+P}, u_k, \ldots, u_{k+P-1}$ (2d)

where $Q_{k+1}, \ldots, Q_{k+P} \in \mathbb{R}^{n \times n}$ and $R_k, \ldots, R_{k+P-1} \in \mathbb{R}^{n_u \times n_u}$ are positive semidefinite matrices. $Q \in \mathbb{R}^{n \times n}$ is a positive semidefinite matrix if $x^T Q x \geq 0$ for every $x \in \mathbb{R}^n$, and $\|x\|_Q = \sqrt{x^T Q x}$ if $x^T Q x \geq 0$ for every $x \in \mathbb{R}^n$. In one nonlimiting example, for seizure mitigation via electrical neurostimulation, $Q_j = I_{n \times n}$, $c_j = 0_{n \times 1}$, and $R_j = \varepsilon I_{n_u \times n_u}$ with $\varepsilon > 0$ for all j, such that the objective becomes largely to steer the total energy in the expected value of the brain signals toward a relatively small value. $\varepsilon$ corresponds to an input energy utilization weight and may be used to penalize excessive stimulation.

In equation (2a), the third term on the right, corresponds to a quadratic term on the input and is configured to represent an applied electrical neurostimulation signal. The quadratic term on the input is configured to add a penalization term for stimulating a patient too harshly, since this may be unsafe, create discomfort for the patient, or result in harmful psychological effects. It may be appreciated that, if the system states are estimated, a separation principle for discrete-time fractional-order systems may apply and provide that MPC with state estimation may be performed for these systems.

As described herein, P is called the prediction horizon. The framework, as described herein, is configured to deploy a control strategy associated with a portion of the prediction horizon corresponding to the first M time steps (referred to as the control horizon). In other words, after state $x_{k+M-1}$ is reached, k is updated with k+M-1 and a new, i.e., updated, solution may be determined. Thus, an optimal strategy may be re-evaluated based on a relatively short-term control action implementation of a relatively long-term prediction.

In an embodiment, fractional-order model predictive control may be implemented using a multivariate autoregressive model (MVAR) approximation. Both time-invariant and time-varying fractional-order dynamical systems may be approximated as MVAR models of order p. The MVAR models may then be recast asp-augmented LTI (linear time invariant) systems. For example, Eq. 1b may be rewritten as:

$$x_{k+1} = \sum_{j=0}^{p-1} A_j x_{k-j} + B u_k + w_k \tag{3a}$$

corresponding to a linear time-invariant (LTI) system. An augmented state vector may be defined as:

$$\tilde{x}_k = \begin{bmatrix} x_k \\ \vdots \\ x_{k-p+1} \end{bmatrix} \tag{3b}$$

where $x_k=0$ for $k \in \{-1, \ldots, -p+1\}$. The first block in $\tilde{x}_{k+1}$ may then be stated as a linear combination of the block in $\tilde{x}_k$ through Eq. (3a). The remaining p−1 blocks in $\tilde{x}_{k+1}$ may then correspond to the first p−1 blocks of $\tilde{x}_k$. A p-augmented LTI system may then be written as:

$$\tilde{x}_{k+1} = \begin{bmatrix} A_0 & \cdots & A_{p-2} & A_{p-1} \\ I & \cdots & 0 & 0 \\ \vdots & \ddots & \vdots & \vdots \\ 0 & \cdots & I & 0 \end{bmatrix} \tilde{x}_k + \begin{bmatrix} B \\ 0 \\ \vdots \\ 0 \end{bmatrix} u_k + \begin{bmatrix} I \\ 0 \\ \vdots \\ 0 \end{bmatrix} w_k = \tag{3c}$$

$$\tilde{A}\tilde{x}_k + \tilde{B}u_k + \tilde{B}^w w_k$$

for k=0, 1, . . . .

It may be appreciated that for a time-varying FOS system, e.g., Eq. (1a), state coupling matrix $A_j$ is indexed by k, i.e., $A_{k,0}=A_k-\text{diag}(\alpha_1, \ldots, \alpha_n)$ for j=0, and $A_{k,j}=-D(\alpha, j+1)$ for j≠0, as described herein. A finite history approximation, for a linear time-varying p-augmented model, may then be written as:

$$\tilde{x}_{k+1} = \tilde{A}_k \tilde{x} + \tilde{B}_k u_k + \tilde{B}_k^w w_k \tag{4}$$

An MVAR approximation of a FOS (fractional order system) plant, re-written as an LTI model, may facilitate determination of a relatively efficient numerical solution for quadratic-cost optimal control via, for example, finite horizon linear quadratic Gaussian control.

It may be appreciated that parameters A and α are configured to model spatial coupling and fractional coefficients, respectively. Thus, values of A and α are related to the specific neurophysiological system being modeled and that is configured to receive neurostimulation. Parameters A and α may be estimated based, at least in part, on experimental data, e.g., electroencephalographic data, captured from the target neurophysiological system. In one nonlimiting example, α may be estimated using a wavelet technique. However, this disclosure is not limited in this regard. In another nonlimiting example, A may be estimated utilizing a sequential optimization technique similar to an expectation-maximization (EM) technique. The EM technique may be utilized for maximum likelihood estimation of parameters subject to hidden variables.

In an embodiment, there is provided a system controller circuitry for mitigating a neurophysiological disorder. The system controller circuitry includes an optimization module, a feedback control module, and a model update module. The optimization module is configured to predict a sequence of control inputs based, at least in part, on a fractional order model of a neurophysiological system. A duration of the predicted sequence of control inputs corresponds to a prediction horizon. The feedback control module is configured to provide at least a portion of the sequence of control inputs to the neurophysiological system based, at least in part, on a current state of the neurophysiological system. A duration of the at least a portion corresponds to a control horizon. The model update module is configured to update one or more of a model parameter and/or an objective function parameter at an update interval, based, at least in part, on a recent state of the neurophysiological system.

Figure 1:
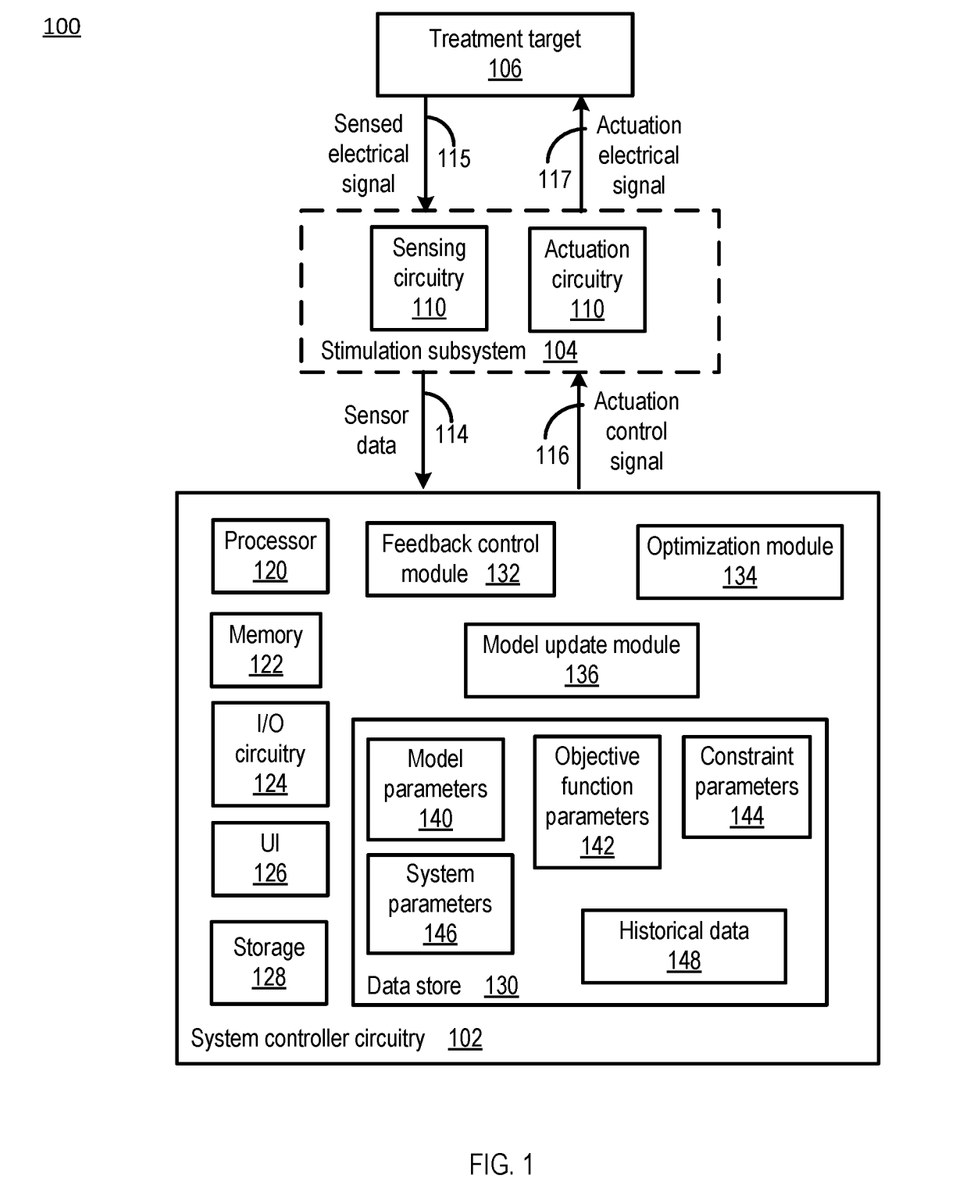
FIG. 1 illustrates a functional block diagram of a system for mitigation of a neurological disorder, including a system controller circuitry, consistent with several embodiments of the present disclosure.

FIG. 1 illustrates a functional block diagram of a system for mitigation of a neurological disorder 100, including a system controller circuitry 102, consistent with several embodiments of the present disclosure. The system 100, including the system controller circuitry 102, is configured to mitigate a neurophysiological disorder. System 100 further includes a stimulation subsystem 104 and a treatment target 106. The treatment target 106 may include, but is not limited to, at least a portion of a human neurophysiological system. The stimulation subsystem 104 includes sensing circuitry 110 and actuation circuitry 112. In some embodiments, sensing circuitry 110 and actuation circuitry 112 may correspond to a same circuitry. In one nonlimiting example, sensing circuitry 110 and actuation circuitry 112 may each include at least one electrode configured to capture or provide an electrical signal. Stimulation subsystem 104 is configured to be positioned relative to a neurophysiological system on, in, or near a target region, i.e., treatment target 106. For example, stimulation subsystem 104 may include a plurality of electrodes positioned relative to the target region and relative to each other. A respective location of each electrode may generally be known. In one nonlimiting example, stimulation subsystem 104 may be positioned on a surface of a skull, on a surface of the brain, and/or may be implanted within the brain on, in, or near treatment target 106. Thus, in this example, the treatment target 106 may be located within the brain. However, this disclosure is not limited in this regard.

Sensing circuitry 110 may be configured to detect and/or capture a sensed electrical signal 115 from treatment target 106. Stimulation subsystem 104 may then be configured to provide corresponding sensor data 114 to system controller circuitry 102. Stimulation subsystem 104 may be configured to receive an actuation control signal 116 from system controller circuitry 102. Actuation circuitry 112 may be configured to provide a corresponding actuation electrical signal 117 to treatment target 106. In some embodiments, stimulation subsystem 104 may be configured to process captured sensed electrical signals 115 to generate sensor data 114 and/or to process actuation control signal 116 to generate actuation electrical signal 17.

System controller circuitry 102 includes a processor 120, memory 122, input/output (I/O) circuitry 124, a user interface (UI) (e.g., display, keyboard, mouse, touchpad, etc.) 126, storage 128, and/or data store 130. System controller circuitry 102 may further include a feedback control module 132, an optimization module 134, and/or a model update module 136.

Processor 120 may include, but is not limited to, a single core processing unit, a multicore processor, a graphics processing unit, etc. Memory 122 may be configured to store one or more of feedback control module 132, optimization module 134, and/or model update module 136. I/O circuitry 124 may be configured to receive sensor data 114 and/or to provide actuation control signal 116. Memory 122 and/or storage 128 may be configured to store at least a portion of data store 130. Data store 130 may be configured to store one or more of model parameters 140, objective function parameters 142, constraint parameters 144, system parameters 146, and/or historical data 148.

Model parameters 140 may include, but are not limited to, one or more fractional order coefficient(s) ($\alpha$), state coupling matrix (A) dimensions and values, input matrix (B) values, weight matrix ($B^w$) values, and noise term w characteristics, as described herein. Objective function parameters 142 may include, but are not limited to, state quadratic matrix (Q) values, input coefficient vector (c) values, input quadratic matrix (R) values, and prediction horizon (P) value, as described herein. Constraint parameters 144 include an acceptable range for values of state variables and/or an acceptable range on values of input variables, as described herein. In one nonlimiting example, constraint parameters 144 may include an input energy utilization weight, $\varepsilon > 0$. System parameters 146 may include, but are not limited to, a memory horizon (p) value, a number (in) of sensors, and/or a control horizon (M) value, as described herein. Historical data 148 may include prior values of state variables that may be used to update one or more model parameters and/or objective function parameters, as described herein.

In operation, system controller circuitry 102, e.g., optimization module 134, may be configured to perform initialization operations. The initialization operations may generally be performed prior to using system controller circuitry 102 and the stimulation subsystem 104 to provide therapeutic electrical stimulation to target region 106 configured to mitigate a neurophysiological disorder. Initialization operations may include, for example, estimating and/or receiving one or more of model parameters 140, objective function parameters 142, constraint parameters 144, and/or system parameters 146, and storing these parameters in data store 130.

Optimization module 134 may then be configured to capture and/or acquire sensor data 114 over a sensing time interval. For example, sensor data 114 may be acquired from stimulation subsystem 104 and sensing circuitry 110. In one nonlimiting example, for epileptic seizures, the sensor data may correspond to an electroencephalogram (EEG) or an intracranial electroencephalogram (iEEG). However, this disclosure is not limited in this regard. The sensor data may be stored in the historical data 148. A duration of the sensing time interval may generally be greater than or equal to the prediction horizon, P. The sensor data 114 may be captured from one or more sensors, with each sensor corresponding to a respective channel. The sensor data 114 may then correspond to a sampled sensor electrical signal detected from treatment target 106. The sensor electrical signal samples may then correspond to system state data, $x_k$.

Optimization module 134 may then be configured to predict a sequence of control inputs ($u_k$) based, at least in part, on a fractional order model of a neurophysiological system corresponding to target region 106. Optimization module 134 may then be configured to determine (i.e., predict) the sequence of control inputs ($u_k$) based, at least in part, on the sensor electrical signal samples (i.e., sensor data 114), and based, at least in part, on the system cost function.

For example, the sequence of control inputs may be determined configured to minimize a quadratic cost function (e.g., Eq. 2a) subject to constraints, as described herein. The sequence of control inputs may be determined for a time interval corresponding to the prediction horizon, P.

Feedback control module 132 may be configured to monitor stimulation subsystem 104 and sensor data 114 to determine when an actuation control signal 116 should be initiated. The actuation control signal 116 may correspond to a sequence of control inputs, $u_k$, having a duration corresponding to the control horizon, as described herein. In one nonlimiting example, an actuation criterion may include detection of an imminent epileptic seizure. If the actuation criterion is met, feedback control module 132 may be configured to generate an actuation control signal 116 based, at least in part, on the determined sequence of control inputs having a duration corresponding to the control horizon. Stimulation subsystem 104 (e.g., actuation circuitry 110) may then be configured to provide actuation electrical signal 117, corresponding to actuation control signal 116, to treatment target 106. Feedback control module 132 may be configured to provide the actuation control signal 116 for a time interval corresponding to the control horizon, M, as described herein. The control horizon may generally correspond to a portion of the prediction horizon.

Model update module 136 is configured to determine whether an update interval has elapsed since a prior update. If the update interval has elapsed since the prior update, model update module 136 and/or optimization module 134 are configured to update one or more of model parameters 140, and/or objective function parameters 142, based, at least in part, on current and/or recent state data. As used herein, recent state data corresponds to prior sensor data stored in historical data 148. In one nonlimiting example, recent state data may correspond to sensor data captured during a time interval with duration on the order of tens of seconds prior to a current time. It may be appreciated that neurophysiological characteristics may generally vary over time. The update interval is configured to accommodate such variation over time and to facilitate prediction accuracy for a time varying system, e.g., a neurophysiological system, as described herein.

Thus, system controller circuitry 102 may be configured to implement fractional order model predictive control to mitigate a neurophysiological disorder. Information included in sensed data may be utilized to optimize the control for the particular treatment target and characteristics of the neurophysiological disorder. The control is configured to include closed loop feedback and is configured to update periodically to accommodate time varying aspects of the neurophysiological system. The optimization further includes constraints configured to limit an amount of stimulation for both safety and patient comfort.

Figure 2:
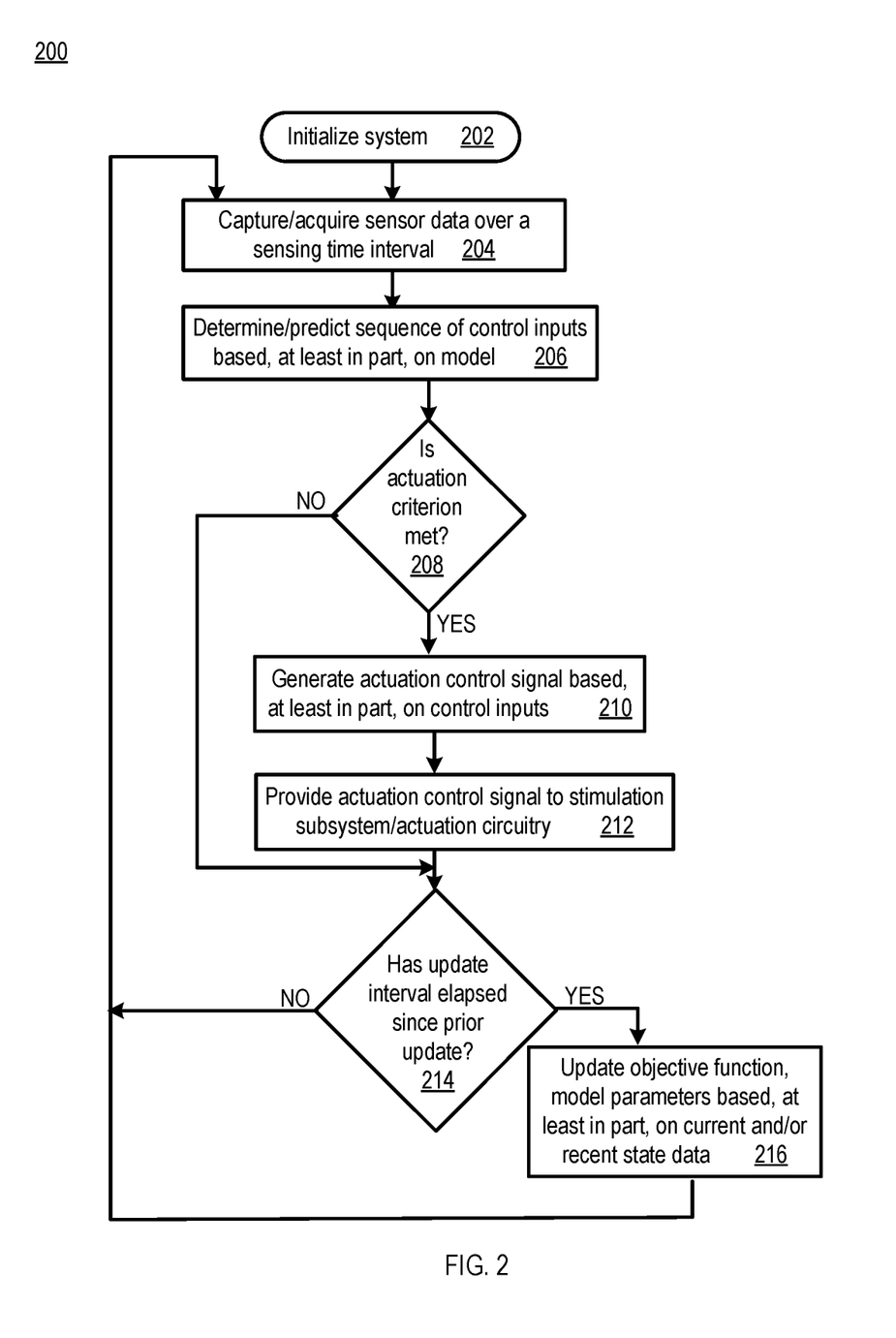
FIG. 2 is a flowchart of neurological disorder mitigation operations according to various embodiments of the present disclosure.

FIG. 2 a flowchart 200 of neurological disorder mitigation operations according to various embodiments of the present disclosure. In particular, the flowchart 200 illustrates predicting a sequence of control inputs configured to mitigate a neurophysiological disorder based, at least in part, a fractional order model. The operations may be performed, for example, by system controller circuitry 102 (e.g., feedback control module 132, optimization module 134, and/or model update module 136) of FIG. 1.

Operations of this embodiment may begin with initializing the system at operation 202. Operation 204 includes capturing and/or acquiring sensor data over a sensing time interval. A sequence of control inputs may be determined and/or predicted based, at least in part, on the model at operation 206. Whether an actuation criterion is met may be determined at operation 208. If the actuation criterion is not met, program flow may proceed to operation 214. If the actuation criterion is met, an actuation control signal may be generated based, at least in part, on control inputs at operation 210. The actuation control signal may be provided to a stimulation subsystem and/or actuation circuitry at operation 212.

Whether an update interval has elapsed since a prior update may be determined at operation 214. If the update interval has not elapsed, program flow may return to operation 204. If the update interval has elapsed, the objective function parameters and model parameters may be updated based, at least in part, on current and/or recent state data at operation 216. Program flow may then return to operation 204.

Thus, a sequence of control inputs configured to mitigate a neurophysiological disorder may be predicted based, at least in part, a fractional order model.

Illustrative Example

The following example is configured to illustrate operation of a fractional-order MPC framework, according to the present disclosure, for neurostimulation in the context of mitigating epileptic seizures. The illustrative example relies primarily on intracranial electroencephalogram (iEEG) data. In particular, the example utilized real-time intracranial electroencephalogram (iEEG) data for three human subjects undergoing epileptic seizures. For the three human subjects, the underlying model was assumed to be a fractional order system (FOS) that would capture evolution of epileptic seizure data. For this example, the linear FOS model corresponded to Eq. 1a, with matrix coefficients A, B and $B^w$ not time varying. The noise term, $w_k$, was modeled as AWGN. Four channels (i.e., n=4) of iEEG data were considered.

Approximately one second of ictal activity was utilized to determine matrix A and coupling coefficient $\alpha$. $\alpha$ was estimated using a wavelet technique. A was estimated utilizing a sequential optimization technique similar to an expectation-maximization (EM) technique. The control input was considered to be a single control signal $u_k$ with the matrix $B=[1\ 0\ 0\ 0]^T$ for subjects 1 and 2 and $B=[1\ 1\ 1]^T$ for subject 3. The matrix of weights $B^w$ was assumed to be $B^w=0.2I_4$, where $I_4$ is the 4×4 identity matrix.

Objective function parameters were: $Q_k=I_n$, $R_k=I_{n_u}$, and $c_k=0_{n_y\times 1}$ (with n=4 and $n_u=1$) and safety linear constraints of $-1000 \leq u_k \leq 1000$ for all the subjects. A p=10 step (approximately 19.53 ms (milliseconds)) predictive model approximation of the FOS plant, with a P=100 step (approximately 195.31 ms) prediction horizon and M=80 step (approximately 156.25 ms) control horizon were used for all the simulations. In all of the cases, the actuation signal $u_k$ was activated 4 s (seconds) into the start of the simulation. Results suggest that a system and method, according to the present disclosure, were able to perform amplitude (i.e., seizure) suppression (i.e., mitigation of a neurophysiological disorder) for all the subjects.

It may be appreciated that, while this illustrative example corresponds to an epileptic seizure, a similar strategy may be applied to other neurophysiological disorders including, but not limited to, Parkinson's disease, Alzheimer's, depression, anxiety, etc., consistent with the present disclosure.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. A module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 122 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system controller circuitry for mitigating a neurophysiological disorder, the system controller circuitry comprising:
   an optimization module configured to:
      acquire sensor data corresponding to electrical signals from a neurophysiological system over a sensing time interval from sensing circuitry; and predict a sequence of control inputs based, at least in part, on a fractional order model of the neurophysiological system, a duration of the predicted sequence of control inputs corresponding to a prediction horizon, the fractional order model including non-integer orders;

a feedback control module configured to mitigate through electrical stimulation a neurophysiological disorder by providing at least a portion of the sequence of control inputs to the neurophysiological system based, at least in part, on a current state of the neurophysiological system as determined from the sensor data, a duration of the at least a portion corresponding to a control horizon, wherein each control input of the sequence of control inputs corresponds to an actuation electrical signal provided by actuation circuitry to the neurophysiological system based on an actuation control signal received by the actuation circuitry from the feedback control module; and a model update module configured to update one or more of a model parameter and/or an objective function parameter at an update interval, based, at least in part, on a recent state of the neurophysiological system, as determined from the sensor data.

2. The system controller circuitry of claim 1, wherein the control horizon corresponds to a first portion of the prediction horizon.

3. The system controller circuitry of claim 1, wherein a value of each control input of the predicted sequence of control inputs is subject to a constraint.

4. The system controller circuitry of claim 1, wherein the feedback control module is configured to provide the at least a portion of the sequence of control inputs to the neurophysiological system in response to detecting an abnormality in the neurophysiological system.

5. The system controller circuitry of claim 1, wherein the model parameters are selected from the group consisting of a fractional order coefficient (a), a state coupling matrix dimension, a state coupling matrix (A), an input matrix (B), a weight matrix (Bw), and a noise term (w) characteristic.

6. The system controller circuitry of claim 1, wherein the objective function parameters are selected from the group comprising a state quadratic matrix (Q), an input coefficient vector (c), an input quadratic matrix (R), and a prediction horizon (P) value.

7. The system controller circuitry of claim 1, wherein the fractional order model includes a noise term.

8. A method for mitigating a neurophysiological disorder, the method comprising:

capturing and/or acquiring sensor data corresponding to electrical signals from a neurophysiological system over a sensing time interval from sensing circuitry;

predicting, by an optimization module, a sequence of control inputs based, at least in part, on a fractional order model of the neurophysiological system, a duration of the predicted sequence of control inputs corresponding to a prediction horizon, the fractional order model including non-integer orders;

providing, by a feedback control module, at least a portion of the sequence of control inputs to the neurophysiological system in order to mitigate through electrical stimulation a neurophysiological disorder, the sequence of control inputs based, at least in part, on a current state of the neurophysiological system, a duration of the at least a portion corresponding to a control horizon, wherein each control input of the sequence of control inputs is an actuation electrical signal provided by actuation circuitry to the neurophysiological system based on an actuation control signal received from the feedback control module; and updating, by a model update module, one or more of a model parameter and/or an objective function parameter at an update interval, based, at least in part, on a recent state of the neurophysiological system, as determined from the sensor data.

9. The method of claim 8, wherein the control horizon corresponds to a first portion of the prediction horizon.

10. The method of claim 8, wherein a value of each control input of the predicted sequence of control inputs is subject to a constraint.

11. The method of claim 8, further comprising providing, by the feedback control module, the at least a portion of the sequence of control inputs to the neurophysiological system in response to detecting an abnormality in the neurophysiological system.

12. The method of claim 8, wherein the model parameters are selected from the group comprising a fractional order coefficient (a), a state coupling matrix dimension, a state coupling matrix (A), an input matrix (B), a weight matrix (Bw), and a noise term (w) characteristic.

13. The method of claim 8, wherein the objective function parameters are selected from the group comprising a state quadratic matrix (Q), an input coefficient vector (c), an input quadratic matrix (R), and a prediction horizon (P) value.

14. The method of claim 8, wherein the fractional order model includes a noise term.

15. A computer readable storage device having stored thereon instructions that when executed by one or more processors result in the following operations comprising:

capturing and/or acquiring sensor data corresponding to electrical signals from a neurophysiological system over a sensing time interval from sensing circuitry;

predicting a sequence of control inputs based, at least in part, on a fractional order model of the neurophysiological system, a duration of the predicted sequence of control inputs corresponding to a prediction horizon, the fractional order model including non-integer orders;

providing at least a portion of the sequence of control inputs to the neurophysiological system in order to mitigate through electrical stimulation a neurophysiological disorder, the sequence of control inputs based, at least in part, on a current state of the neurophysiological system, as determined from the sensor data, a duration of the at least a portion corresponding to a control horizon, wherein each control input of the sequence of control inputs is an actuation electrical signal provided by actuation circuitry to the neurophysiological system based on an actuation control signal received from the feedback control module; and updating one or more of a model parameter and/or an objective function parameter at an update interval, based, at least in part, on a recent state of the neurophysiological system, as determined from the sensor data.

16. The computer readable storage device of claim 15, wherein the control horizon corresponds to a first portion of the prediction horizon.

17. The computer readable storage device of claim 15, wherein a value of each control input of the predicted sequence of control inputs is subject to a constraint.

18. The computer readable storage device of claim 15, wherein the instructions that when executed by one or more processors result in the following operations comprising providing the at least a portion of the sequence of control inputs to the neurophysiological system in response to detecting an abnormality in the neurophysiological system.

19. The computer readable storage device of claim 15, wherein the model parameters are selected from the group comprising a fractional order coefficient (a), a state coupling matrix dimension, a state coupling matrix (A), an input matrix (B), a weight matrix (Bw), and a noise term (w) characteristic, and the objective function parameters are selected from the group comprising a state quadratic matrix (Q), an input coefficient vector (c), an input quadratic matrix (R), and a prediction horizon (P) value.

20. The computer readable storage device of claim 15, wherein the fractional order model includes a noise term.

\* \* \* \* \*